(12) United States Patent
Day et al.

(10) Patent No.: US 12,143,502 B2
(45) Date of Patent: Nov. 12, 2024

(54) DATA TRANSFER ACCELERATION VIA CONTENT-DEFINED CHUNKING

(71) Applicant: GM Cruise Holdings LLC, San Francisco, CA (US)

(72) Inventors: Stephen James Day, Kirkland, WA (US); Valient Gough, Kirkland, WA (US); Cheng Pan, Bellevue, WA (US); Seth Alexander Bunce, Seattle, WA (US)

(73) Assignee: GM Cruise Holdings LLC, San Francisco, CA (US)

( * ) Notice: Subject to any disclaimer, the term of this patent is extended or adjusted under 35 U.S.C. 154(b) by 434 days.

(21) Appl. No.: 17/565,902

(22) Filed: Dec. 30, 2021

(65) Prior Publication Data

US 2023/0216690 A1 Jul. 6, 2023

(51) Int. Cl.
*H04L 9/32* (2006.01)
*H04L 9/06* (2006.01)
*H04L 9/14* (2006.01)
*H04L 9/34* (2006.01)

(52) U.S. Cl.
CPC .......... *H04L 9/3242* (2013.01); *H04L 9/0643* (2013.01); *H04L 9/14* (2013.01); *H04L 9/34* (2013.01)

(58) Field of Classification Search
USPC ....................................................... 713/168
See application file for complete search history.

(56) References Cited

U.S. PATENT DOCUMENTS

| | | | | |
|---|---|---|---|---|
| 6,807,632 B1 * | 10/2004 | Carpentier | ............ | H04L 63/065 |
| | | | | 713/180 |
| 7,599,971 B1 * | 10/2009 | Hagerstrom | ........ | G06F 16/1744 |
| 8,176,015 B1 * | 5/2012 | Somerville | ......... | G06F 16/1752 |
| | | | | 707/661 |
| 8,370,315 B1 * | 2/2013 | Efstathopoulos | ... | G06F 16/2228 |
| | | | | 707/699 |
| 8,712,963 B1 * | 4/2014 | Douglis | ............... | G06F 11/2097 |
| | | | | 707/633 |
| 10,019,323 B1 * | 7/2018 | Bai | ...................... | G06F 11/1004 |
| 10,031,682 B1 * | 7/2018 | George | ................ | G06F 3/0647 |
| 10,055,420 B1 * | 8/2018 | Pogde | ................. | G06F 11/1448 |
| 10,120,875 B1 * | 11/2018 | Duggal | .................... | G06F 16/13 |
| 10,120,893 B1 * | 11/2018 | Rocamora | .............. | G06Q 10/10 |
| 10,348,505 B1 * | 7/2019 | Crawforth | ............. | H04L 9/3236 |
| 10,353,907 B1 * | 7/2019 | Gupta | ................... | G06F 16/248 |
| 10,437,682 B1 * | 10/2019 | Jonnala | ................. | G06F 16/182 |
| 10,769,112 B2 * | 9/2020 | Zhu | ...................... | G06F 16/1752 |
| 10,776,321 B1 * | 9/2020 | Balcha | ................ | G06F 16/1752 |
| 10,938,961 B1 * | 3/2021 | Ponnala | .............. | H04L 67/5651 |
| 11,258,585 B2 * | 2/2022 | Barinov | .................. | G06F 21/64 |
| 11,347,747 B1 * | 5/2022 | Paduroiu | ............. | G06F 16/2246 |
| 11,683,180 B1 * | 6/2023 | Crawforth | ............. | H04L 9/0637 |
| | | | | 713/164 |
| 11,922,074 B1 * | 3/2024 | Thomason | ............ | G06F 3/0604 |

(Continued)

*Primary Examiner* — Kambiz Zand
*Assistant Examiner* — Mahabub S Ahmed

(57) ABSTRACT

A computer-implemented method, comprising: dividing a first binary image into a plurality of variable-sized chunks, wherein the first binary image is an aggregate of a plurality of files, and wherein the dividing does not depend on file boundaries; and computing hashes of the variable-sized chunks, and storing the hashes in a content addressable storage (CAS) with the hashes as keys.

19 Claims, 9 Drawing Sheets

(56) References Cited

U.S. PATENT DOCUMENTS

| | | | |
|---|---|---|---|
| 2005/0060535 A1* | 3/2005 | Bartas | H04L 63/02 713/154 |
| 2006/0059173 A1* | 3/2006 | Hirsch | G06F 16/2455 |
| 2006/0235895 A1* | 10/2006 | Rodriguez | H04N 21/631 |
| 2008/0133561 A1* | 6/2008 | Dubnicki | G06F 16/113 |
| 2009/0177855 A1* | 7/2009 | Drews | G06F 11/1448 711/E12.001 |
| 2009/0271779 A1* | 10/2009 | Clark | G06F 16/178 707/999.01 |
| 2009/0276454 A1* | 11/2009 | Smith | G06F 16/1756 707/999.102 |
| 2010/0082636 A1* | 4/2010 | Kruus | G06F 16/13 707/747 |
| 2010/0218037 A1* | 8/2010 | Swartz | G06F 16/00 714/6.12 |
| 2010/0250501 A1* | 9/2010 | Mandagere | G06F 16/285 711/216 |
| 2010/0318759 A1* | 12/2010 | Hamilton | G06F 11/1464 711/171 |
| 2011/0113012 A1* | 5/2011 | Gruhl | G06F 11/1451 707/646 |
| 2011/0113016 A1* | 5/2011 | Gruhl | H03M 7/30 707/693 |
| 2011/0246741 A1* | 10/2011 | Raymond | G06F 16/137 711/170 |
| 2011/0307659 A1* | 12/2011 | Hans | H03M 7/3084 711/E12.001 |
| 2011/0307677 A1* | 12/2011 | David | G06F 9/5016 711/170 |
| 2012/0060035 A1* | 3/2012 | Kalmady | H04L 9/0894 713/176 |
| 2013/0138620 A1* | 5/2013 | Yakushev | G06F 16/951 707/698 |
| 2013/0198475 A1* | 8/2013 | Serlet | G06F 12/0269 711/164 |
| 2013/0212074 A1* | 8/2013 | Romanski | G06F 3/0608 707/692 |
| 2013/0268496 A1* | 10/2013 | Baldwin | G06F 16/1748 707/E17.002 |
| 2013/0318051 A1* | 11/2013 | Kumar | G06F 16/137 707/692 |
| 2014/0052706 A1* | 2/2014 | Misra | G06F 16/1837 707/698 |
| 2014/0115182 A1* | 4/2014 | Sabaa | H04L 67/1097 709/232 |
| 2014/0122791 A1* | 5/2014 | Fingerhut | H04L 45/74591 711/108 |
| 2014/0181198 A1* | 6/2014 | Motes | H04L 67/06 709/204 |
| 2014/0188828 A1* | 7/2014 | Hirsch | G06F 16/2255 707/698 |
| 2014/0250066 A1* | 9/2014 | Calkowski | H04L 67/1097 707/624 |
| 2014/0250067 A1* | 9/2014 | Calkowski | G06F 16/178 707/624 |
| 2014/0258654 A1* | 9/2014 | Mori | G06F 3/061 711/159 |
| 2014/0280664 A1* | 9/2014 | Sengupta | G06F 16/137 709/212 |
| 2015/0186393 A1* | 7/2015 | Serlet | G06F 16/1752 707/828 |
| 2017/0017407 A1* | 1/2017 | Wei | G06F 3/0608 |
| 2017/0070890 A1* | 3/2017 | Luff | H04W 12/106 |
| 2017/0124170 A1* | 5/2017 | Koorapati | G06F 16/27 |
| 2017/0242615 A1* | 8/2017 | Mayo | G06F 16/00 |
| 2018/0113874 A1* | 4/2018 | Sazawa | H04L 67/1097 |
| 2018/0218005 A1* | 8/2018 | Kuhtz | G06F 8/71 |
| 2019/0028571 A1* | 1/2019 | Tomiyama | H04L 69/166 |
| 2019/0138386 A1* | 5/2019 | Konduru | G06F 11/1435 |
| 2019/0391875 A1* | 12/2019 | Hegde | G06F 3/064 |
| 2020/0153900 A1* | 5/2020 | Lebresne | G06F 3/067 |
| 2020/0241778 A1* | 7/2020 | Bassov | G06F 12/0862 |
| 2020/0311030 A1* | 10/2020 | Natanzon | G06F 16/1752 |
| 2020/0327098 A1* | 10/2020 | Gonczi | G06F 16/1752 |
| 2020/0333966 A1* | 10/2020 | Rakulenko | G06F 3/0631 |
| 2020/0341668 A1* | 10/2020 | Gonczi | G06F 3/0688 |
| 2020/0372001 A1* | 11/2020 | Hirose | G06F 16/1748 |
| 2021/0034349 A1* | 2/2021 | Hatakeyama | H04L 63/0428 |
| 2021/0034475 A1* | 2/2021 | Patel | G06F 3/0619 |
| 2021/0064579 A1* | 3/2021 | Wang | G06F 16/152 |
| 2021/0064581 A1* | 3/2021 | Wang | G06F 16/137 |
| 2021/0064582 A1* | 3/2021 | Wang | G06F 16/137 |
| 2021/0097099 A1* | 4/2021 | Patel | G06F 16/334 |
| 2021/0133166 A1* | 5/2021 | Shabi | G06F 3/0683 |
| 2021/0191911 A1* | 6/2021 | Ponnala | H04L 9/0643 |
| 2021/0233204 A1* | 7/2021 | Alattar | G06T 1/005 |
| 2021/0286884 A1* | 9/2021 | Lewis | G06F 3/062 |
| 2021/0377247 A1* | 12/2021 | Nigro | H04L 9/3239 |
| 2022/0114053 A1* | 4/2022 | Dhuse | H04L 9/3247 |
| 2022/0129190 A1* | 4/2022 | Bassov | G06F 3/067 |
| 2022/0179574 A1* | 6/2022 | Dar | G06F 3/0641 |
| 2022/0236904 A1* | 7/2022 | Miller | G06F 3/0652 |
| 2023/0087778 A1* | 3/2023 | Borzov | G06F 16/152 707/692 |
| 2023/0195614 A1* | 6/2023 | LeMay | G06F 12/04 711/154 |
| 2023/0205636 A1* | 6/2023 | Yadav | G06F 11/1448 707/640 |
| 2023/0205639 A1* | 6/2023 | Yadav | G06F 11/1446 707/645 |
| 2023/0205643 A1* | 6/2023 | Yadav | G06F 11/1451 707/645 |
| 2023/0237167 A1* | 7/2023 | Lewis | G06F 21/602 713/168 |

\* cited by examiner

DATA TRANSFER ACCELERATION VIA
CONTENT-DEFINED CHUNKING

FIELD OF THE SPECIFICATION

The present disclosure relates generally to infrastructure for supporting autonomous vehicles (AVs) and more particularly, though not exclusively, to a system and method for download acceleration via content-defined chunking.

BACKGROUND

An autonomous vehicle (AV), also known as a self-driving car, driverless vehicle, or robotic vehicle, uses multiple sensors to sense the environment and move without human input. Automation technology in the AV enables the AV to drive on roadways and to perceive the vehicle's environment accurately and quickly, including obstacles, signs, and traffic lights. The vehicles can be used to pick up passengers and drive the passengers to selected destinations. The vehicles can also be used to pick up packages and/or other goods and deliver the packages and/or goods to selected destinations.

SUMMARY

A computing apparatus, including: a computing apparatus including a processor circuit and a memory; and instructions encoded on the memory to instruct the processor circuit to: divide a first binary data object into a plurality of variable-sized chunks via a content-defined chunking (CDC) algorithm; store chunkwise metadata for the plurality of variable-sized chunks, the chunkwise metadata comprising hashes for the plurality of variable-sized chunks; identify a remote binary data object for download to the computing apparatus; query a content addressable storage (CAS) using the chunkwise metadata to identify a first group of chunks of the first binary data object that are found in the CAS, and a second group of chunks of the binary data object that are not found in the CAS; and download to the computing apparatus only the second group of chunks, and build from the second group of chunks and the first group of chunks a copy of the remote binary data object.

BRIEF DESCRIPTION OF THE DRAWINGS

The present disclosure is best understood from the following detailed description when read with the accompanying FIGURES. In accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

DETAILED DESCRIPTION

Overview

Figure 1:
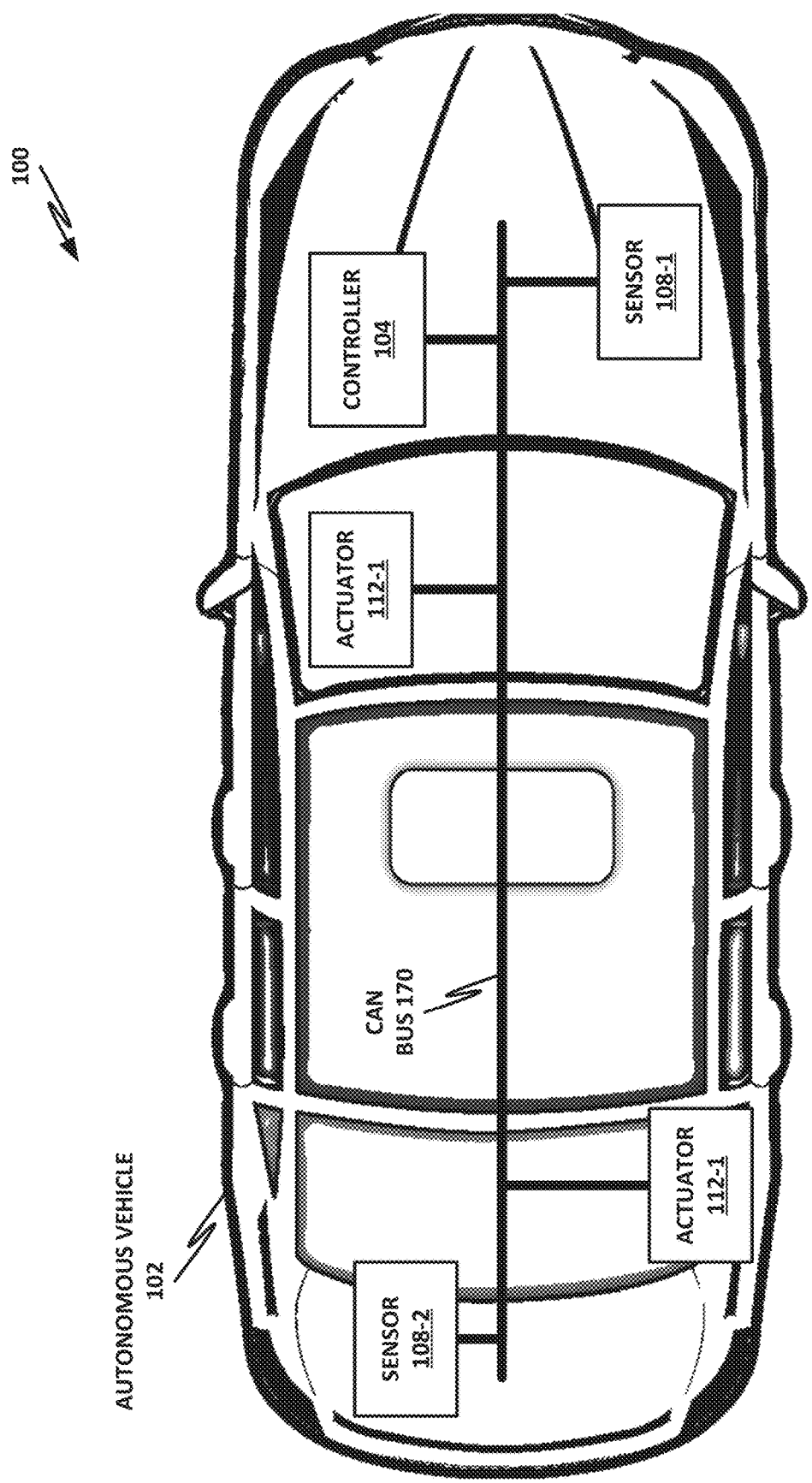
FIG. 1 is a block diagram illustrating an example autonomous vehicle.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Infrastructure services for AV ecosystems may include software services, such as software builds and controller simulations. These software services may use very large binary files (on the order of several gigabytes). The nature of these software tasks is such that a large binary file may be downloaded and used and then replaced a short time later. For example, once a worker node has completed a build task using a SquashFS image, it may move on to a new build task that requires a new SquashFS image. Similarly, once a worker node has completed a simulation task using a simulation "bag" (a data structure that includes the sensor data and video streams used for a simulation), it may move on to a different simulation, using a different bag. Frequent uploading and downloading of large binary data objects may provide substantial strain on network infrastructure. For example, infrastructure services for an AV ecosystem may include software builds and controller simulations, among other services. Software builds may download large binary files, or artifacts, such as file system images that may be bundled in a format such as SquashFS. This file system image may then be run in a container or on a virtual machine to provide the build services. Controller simulations may use so-called "bags" of data to run simulations. These bags may include sensor data collected during real-world operating conditions that can be used to validate and improve the performance of the AV controller.

Tasks such as simulations, builds, and others may use large data sets, and a data set may be written once and read many times. For example, a SquashFS build image may be written once and used many times by a variety of worker nodes. When a SquashFS image is updated, a relatively small portion of the data may be changed. However, because the SquashFS image is a large binary data file, changing even a small part of it will change its checksum and thus invalidate any versions that use the old image. Thus, updated file system images may need to be uploaded to a server, or downloaded from a server. Throughout this specification, downloads are used as an example of data transfers. However, the chunkwise data transfer teachings of the present specification may be similarly be used for uploading data.

For example, a SquashFS image may be checksummed and stored on a CAS or other data store. It may be written once and downloaded by several worker nodes. Various worker nodes may download the SquashFS image by name or by its hash. Because the SquashFS images are multiple gigabytes, continuously downloading them on various worker nodes may tax the network infrastructure. Furthermore, in cloud-based storage solutions, continuously downloading large file system images may run up against contractual bandwidth limits. While intermediate caches may help to mitigate the contractual issues, it is still advantageous to provide a system that reduces downloads of large binary data files.

Because large portions of a file system image often remain the same even once the image is updated, it is advantageous to provide a system and method to update file system images without requiring a full download of the entire image. Embodiments of the system and method disclosed herein provide such updates by using CDC algorithms. For example, FastCDC is a CDC algorithm that is well-suited to the present specification. CDC may divide a binary object into a plurality of chunks of a non-uniform size. The size of the chunk is determined by hashing a sliding window across the binary image to identify usable boundaries that are expected to result in a high level of data reuse. The CDC algorithm may provide a tunable difficulty and may also provide minimum and maximum sizes for each chunk. These parameters determine the average chunk size in a particular system. For example, an illustrative embodiment may provide an average chunk size of approximately 256 kilobytes.

Other CDC or chunking algorithms are also compatible with the teachings herein, such as Rabin, gear-based CDC, or similar. In some examples, a specific chunking algorithm may be correlated with a particular data type. For example, SquashFS is disclosed herein as an illustrative binary data format. Other formats may also be used, such as "bags" for simulation data, .zip files, tarballs, or similar. Appropriate chunking algorithms may be selected for each data type.

As the CDC algorithm divides the large binary file into a plurality of chunks, it may also store metadata for each of the chunks. A metadata frame may include, for example, an offset location for the chunk, a size of the chunk, and a hash of the chunk. In one example, a metadata file with an illustrative file extension of ".ct" stores the metadata records for a particular file system image. With 256 kilobyte chunks, the ".ct" file for a 6-gigabyte file system image is approximately 1 megabyte. The size of the ".ct" file may scale linearly with the size of the original file.

Rather than using fixed size and fixed position chunks, the CDC algorithm can break the large file into variable size chunks based on the content of the file. CDC allows for better results in the case of erasure and insertion of data within the large binary data. It also reduces the dependency on location within a file. For example, if a file is divided into a sequence of fixed-sized chunks, then changing any of those chunks may cause misalignment of any data that follows. Thus, if a change occurs near the beginning of a large binary file, the rest of the file may become unsynchronized. On the other hand, CDC allows greater flexibility. Because CDC seeks chunk boundaries based on content, it is more likely to result in chunks that are relatively independent of one another.

This can provide increased efficiency when downloading an update to a file. For example, the system may receive a large binary image such as a SquashFS file. The system may use a CDC algorithm such as FastCDC to divide the file into a series of variable-sized chunks. The system may also store a metadata file that correlates to the original binary image where the metadata file stores a hash of each chunk, an offset of the chunk, and a length of the chunk. The chunk metadata records may, in one example, be stored in a CAS with the hash of the chunk acting as the CAS key. Thus, chunks can be queried by their hash rather than by their position.

When the system needs to update the SquashFS image, it may fetch a manifest for the updated image from the server that hosts the updated image. This manifest may similarly include a ".ct" file that includes a sequence of chunk hashes along with locations and sizes. The worker node may iterate through the hashes in the manifest, querying the CAS for each hash. If a hash is found, then the data for that chunk are available in the local cache. In some embodiments, the data may be available even if they are not in the correct order. For example, if a chunk moved to a different location in the file, it need not be discarded. Rather, a download accelerator library may build a download plan by identifying chunks from the manifest that are also found in the local cache. These chunks may be reused, even if they need to be sorted into a different location. Any chunks that are not found in the CAS may need to be downloaded from the server. Advantageously, the system does not need to download the entire file. Rather, the system may issue hypertext transfer protocol (HTTP) GET requests with byte-position offsets to download only those chunks that are needed to fill in the gaps in the existing file. Similarly, for an upload, an HTTP PUT request with an appropriate byte-position offset may be used. Once the missing chunks are downloaded, the download library may, as necessary, reorganize chunks and insert downloaded chunks to create a copy of the updated binary image. Any chunks from the original image that are not used in the new image may then be discarded.

The result is a binary copy of the updated file that does not require downloading the entire file. As an extra verification, the manifest may include a hash of the file on the server. The local system may hash the newly compiled version of the file and compare that hash to the hash from the manifest. If the hashes match, then the download is determined to be a success. If the hashes do not match, then remedial action may need to be taken. For example, in the case of a failed hash, the full updated file may be downloaded from the server to correct any errors.

This provides greater efficiency for the large number of binary objects that are very similar or nearly identical to one another.

The download accelerator library disclosed herein realizes further advantages in that the server that hosts the data objects may need little to no modification. Because HTTP GET requests can be used to download only those chunks that are needed, modifications to the server may be minimal. In some cases, the server, or a dedicated function, appliance, container, or virtual machine, or other node may chunk the binary file in-band. In some examples, the first worker node to download the file may chunk it, and upload the ".ct" file to the server.

Embodiments disclosed herein may optionally implement an out-of-band metadata file to describe chunks of the artifact. The metadata produced and consumed may be relatively small compared to the binary artifacts themselves. For example, the metadata file may be on the order of 0.016 percent of the size of the full artifact. Experimentally, it has been found that approximately 70 percent of already downloaded SquashFS files may already exist on a system when an update is to be downloaded. Thus, downloading only approximately 30 percent of a large binary file instead of the whole file can realize significant savings in infrastructure requirements and download times.

The download accelerator library illustrated herein may also be capable of running an in-band mode where artifacts may be stored in a custom format of the download accelerator library. This format may allow for de-duplication of content to save on cloud storage costs. However, this mode could be considered as being more invasive as it does not leave the original files intact, and is not necessary to realize the advantages described herein.

For the download accelerator to optimize downloads, it may require access to metadata describing the download target. The metadata need not change how the assets are stored, and in some cases, the metadata may be kept in a separate data store. This provides options for producing and storing metadata for updated objects on the server side. For example, in one embodiment metadata may be produced when the artifacts are created. The metadata may then be stored side-by-side with the artifacts. This is a highly efficient option in terms of consumption by worker nodes. Experimentally, metadata generation can process between 350 megabytes per second and 600 megabytes per second when I/O allows it. This may be done on the fly in the background during an artifact upload.

Figure 2:
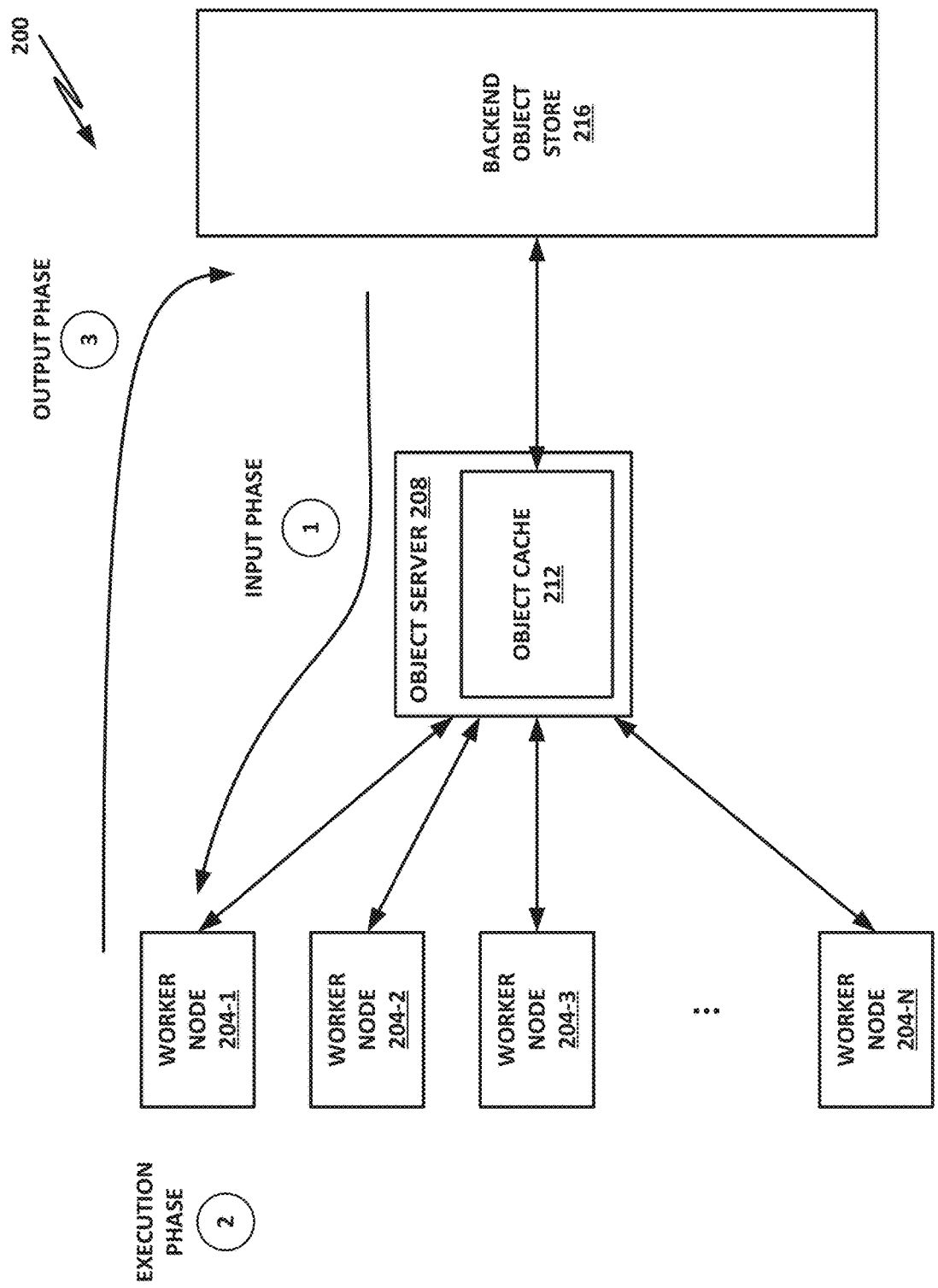
FIG. 2 is a block diagram illustration of selected embodiments of an AV infrastructure ecosystem.

Alternatively, metadata may be produced on the fly. For example, when a worker node downloads an artifact that does not have a metadata file, the download accelerator library may produce the metadata file and upload it to a shared location to speed up future downloads by other workers, as illustrated in FIG. 2 below. This requires the first worker node that encounters the artifact to download the entire artifact and perform the chunking, but provide significant savings for other worker nodes that download the file. If a goal is to reduce load on the system as a whole, rather than optimizing for a single worker node, this may be an appropriate tradeoff. As before, the metadata may be stored side-by-side with the artifact or in a separate location entirely, which may avoid disturbing artifact repositories. Thus, depending on the importance of maintaining the server repositories as-is, various options are available for implementing chunking of data on the server side.

The foregoing can be used to build or embody several example implementations, according to the teachings of the present specification. Some example implementations are included here as nonlimiting illustrations of these teachings.

Detailed Description of the Drawings

A system and method for download acceleration via content-defined chunking will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram 100 illustrating an example autonomous vehicle 102. Autonomous vehicle 102 may be, for example, an automobile, car, truck, bus, train, tram, funicular, lift, or similar. Autonomous vehicle 102 could also be an autonomous aircraft (e.g., fixed wing, rotary, or tiltrotor), ship, watercraft, hover craft, hydrofoil, buggy, cart, golf cart, recreational vehicle, motorcycle, off-road vehicle, three- or four-wheel all-terrain vehicle, or any other vehicle. Except to the extent specifically enumerated in the appended claims, the present specification is not intended to be limited to a particular vehicle or vehicle configuration.

In this example, autonomous vehicle 102 includes one or more sensors, such as sensor 108-1 and sensor 108-2. Sensors 108 may include, by way of illustrative and non-limiting example, localization and driving sensors such as photodetectors, cameras, radio detection and ranging (RADAR), SONAR, light detection and ranging (LIDAR), GPS, inertial measurement units (IMUS), synchros, accelerometers, microphones, strain gauges, pressure monitors, barometers, thermometers, altimeters, wheel speed sensors, computer vision systems, biometric sensors for operators and/or passengers, or other sensors. In some embodiments, sensors 108 may include cameras implemented using high-resolution imagers with fixed mounting and field of view. In further examples, sensors 108 may include LIDARs implemented using scanning LIDARs. Scanning LIDARs have a dynamically configurable field of view that provides a point-cloud of the region intended to scan. In still further examples, sensors 108 includes RADARs implemented using scanning RADARs with dynamically configurable field of view.

Autonomous vehicle 102 may further include one or more actuators 112. Actuators 112 may be configured to receive signals and to carry out control functions on autonomous vehicle 102. Actuators may include switches, relays, or mechanical, electrical, pneumatic, hydraulic, or other devices that control the vehicle. In various embodiments, actuators 112 may include steering actuators that control the direction of autonomous vehicle 102, such as by turning a steering wheel, or controlling control surfaces on an air or watercraft. Actuators 112 may further control motor functions, such as an engine throttle, thrust vectors, or others. Actuators 112 may also include controllers for speed, such as an accelerator. Actuators 112 may further operate brakes, or braking surfaces. Actuators 112 may further control headlights, indicators, warnings, a car horn, cameras, or other systems or subsystems that affect the operation of autonomous vehicle 102.

A controller 104 may provide the main control logic for autonomous vehicle 102. Controller 104 is illustrated here as a single logical unit and may be implemented as a single device such as an electronic control module (ECM) or other. In various embodiments, one or more functions of controller 104 may be distributed across various physical devices, such as multiple ECMs, one or more hardware accelerators, artificial intelligence (AI) circuits, or other.

Controller 104 may be configured to receive from one or more sensors 108 data to indicate the status or condition of autonomous vehicle 102, as well as the status or condition of certain ambient factors, such as traffic, pedestrians, traffic signs, signal lights, weather conditions, road conditions, or others. Based on these inputs, controller 104 may determine adjustments to be made to actuators 112. Controller 104 may determine adjustments based on heuristics, lookup tables, AI, pattern recognition, or other algorithms.

Various components of autonomous vehicle 102 may communicate with one another via a bus such as controller area network (CAN) bus 170. CAN bus 170 is provided as an illustrative embodiment, but other types of buses may be used, including wired, wireless, fiberoptic, infrared, WiFi, Bluetooth, dielectric waveguides, or other types of buses. Bus 170 may implement any suitable protocol. for example, in some cases bus 170 may use transmission control protocol (TCP) for connections that require error correction. In cases where the overhead of TCP is not preferred, bus 170 may use a one-directional protocol without error correction, such as user datagram protocol (UDP). Other protocols may also be used. Lower layers of bus 170 may be provided by protocols such as any of the family of institute of electrical and electronics engineers (IEEE) 802 family of communication protocols, including any version or subversion of 802.1 (higher layer Local Area Network (LAN)), 802.2 (logical link control), 802.3 (Ethernet), 802.4 (token bus), 802.5 (token ring), 802.6 (metropolitan area network), 802.7 (broadband coaxial), 802.8 (fiber optics), 802.9 (integrated service LAN), 802.10 (interoperable LAN security), 802.11 (wireless LAN), 80.12 (100 VG), 802.14 (cable modems), 802.15 (wireless personal area network, including Bluetooth), 802.16 (broadband wireless access), or 802.17 (resilient packet ring) by way of illustrative and nonlimiting example. Non-IEEE and proprietary protocols may also be supported, such as for example, InfiniBand, FibreChannel, FibreChannel over Ethernet (FCoE), Omni-Path, Lightning bus, or others. Bus 170 may also enable controller 104, sensors 108, actuators 112, and other systems and subsystems of autonomous vehicle 102 to communicate with external hosts, such as Internet-based hosts. In some cases, autonomous vehicle 102 may form a mesh or other cooperative network with other autonomous vehicles, which may allow sharing of sensor data, control functions, processing ability, or other resources.

Figure 8:
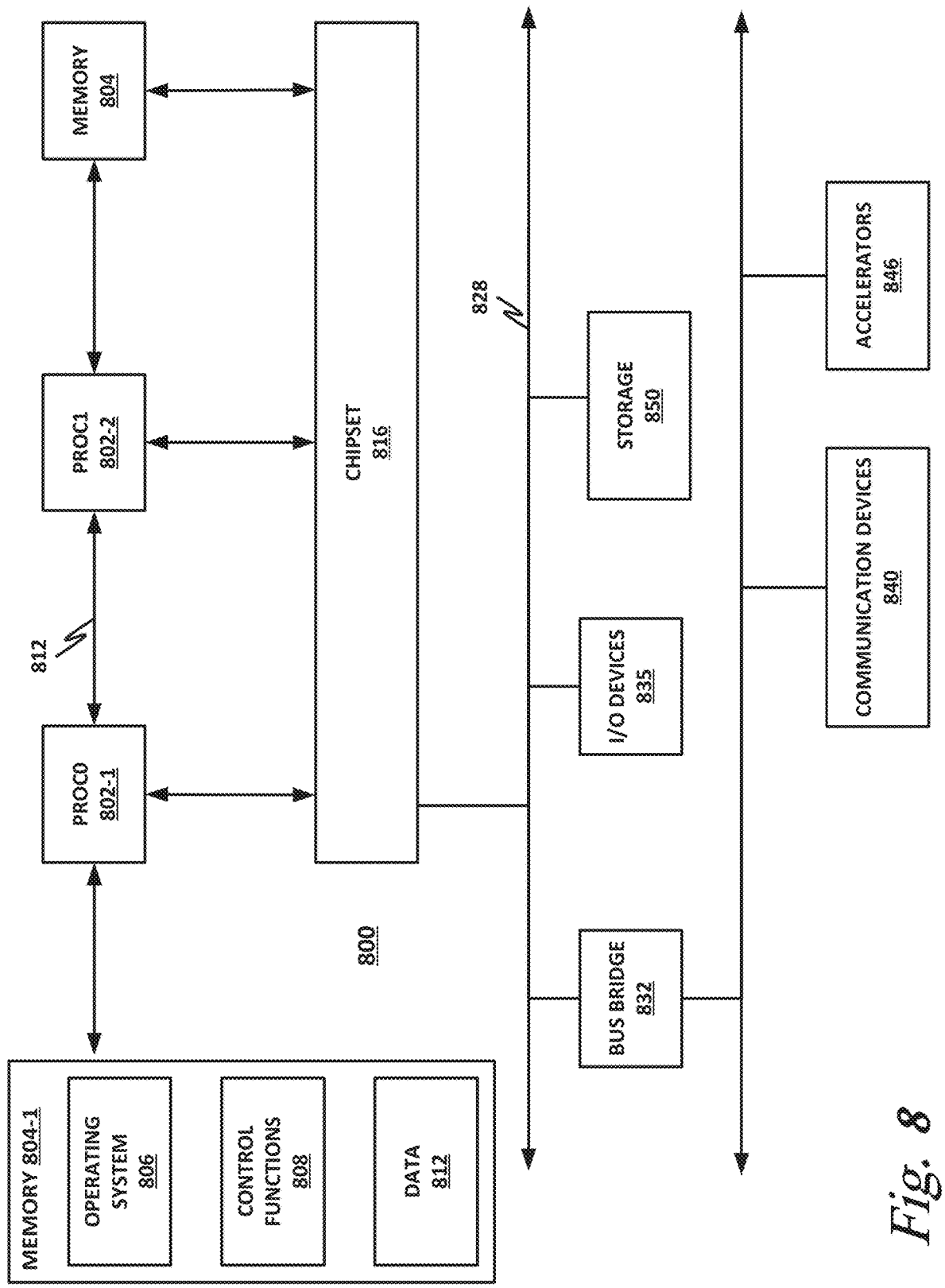
FIG. 8 is a block diagram of selected elements of a hardware platform.

Controller 104 may control the operations and functionality of autonomous vehicles 102, or one or more other autonomous vehicles. Controller 104 may receive sensed data from sensors 108, and make onboard decisions based on the sensed data. In some cases, controller 104 may also offload some processing or decision making, such as to a cloud service or accelerator. In some cases, controller 104 is a general-purpose computer adapted for I/O communication with vehicle control systems and sensor systems. Controller 104 may be any suitable computing device. An illustration of a hardware platform is shown in FIG. 8, which may represent a suitable computing platform for controller 104. In some cases, controller 104 may be connected to the Internet via a wireless connection (e.g., via a cellular data connection). In some examples, controller 104 is coupled to any number of wireless or wired communication systems. In some examples, controller 104 is coupled to one or more communication systems via a mesh network of devices, such as a mesh network formed by autonomous vehicles.

According to various implementations, autonomous vehicle 102 may modify and/or set a driving behavior in response to parameters set by vehicle passengers (e.g., via a passenger interface) and/or other interested parties (e.g., via a vehicle coordinator or a remote expert interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

Autonomous vehicle 102 is illustrated as a fully autonomous automobile but may additionally or alternatively be any semi-autonomous or fully autonomous vehicle. In some cases, autonomous vehicle 102 may switch between a semi-autonomous state and a fully autonomous state and thus, some autonomous vehicles may have attributes of both a semi-autonomous vehicle and a fully autonomous vehicle depending on the state of the vehicle.

Controller 104 may benefit from software builds and from simulation services provided by an infrastructure for the AV ecosystem. As described above, the software builds and simulations may require downloading large data files or artifacts. Thus, it is advantageous to provide a download accelerator library to expedite such downloads and increase their efficiency.

FIG. 2 is a block diagram illustration of selected embodiments of an AV infrastructure ecosystem 200. AV infrastructure ecosystem 200 may provide support services as discussed throughout this specification, including without limitation simulation services, remote execution for software builds (using a service such as Bazel, for example), support services, and other.

Infrastructure ecosystem 200 is supported in part by a backend object store 216. Backend object store 216 may be, for example, a cloud data service and may provide large-scale storage services. Although backend object store 216 may provide a network connection that is fast enough and suitable for human perceptible times (e.g., on the order of seconds), the access speeds may not be suitable for real-time operation of infrastructure ecosystem 200. Furthermore, if all data is accessed from backend object store 216, the usage may exceed bandwidth limits or service-level-agreements (SLAB) for monthly data usage. Thus, it may be desirable to have an object server 208 that supports backend object store 216. Object server 208 may not store a copy of all objects available on backend object store 216 but may store objects that are currently in demand by a plurality of worker nodes 204.

A plurality of worker nodes 204 are illustrated, namely worker node 204-1, worker node 204-2, worker node 204-3 through worker node 204-N. Worker nodes 204 may be configured to run various workloads and may require data for their workloads. A worker operation may be divided into three phases.

In an input phase (designated by circle 1 in FIG. 2), a worker node 204 requests an object from object server 208. Object server 208 may query object cache 212 to determine if the object is available in object cache 212. If the object is not available in object cache 212, the object may be backfilled from backend object store 216 and then stored in object cache 212. The object may then remain in object cache 212 unless, and until, it is evicted therefrom. The eviction mechanism may include a least recently used (LRU) mechanism. Object server 208 may then return the object to worker node 204, which may store the object in an LRU local cache. The object is then available locally for worker node 204 until it is evicted.

The input phase may include movement of large artifacts, such as SquashFS filesystem images of multiple gigabytes. Because numerous worker nodes may require numerous artifacts in the course of a single day, artifact downloads may significantly tax the system infrastructure. Thus, it may be beneficial for worker nodes 204 to provide respective download accelerator libraries to assist in the downloads.

In the execution phase (designated by circle 2), a worker node 204 performs its intended function, such as performing a simulation or performing some other work. Once execution phase 2 is finished, an output phase (designated by circle 3) may commence. In output phase 3, the worker node 204 exports its data. For example, worker node 204 may export data to backend object store 216 where the results of the simulation or other work may be made available.

Figure 3:
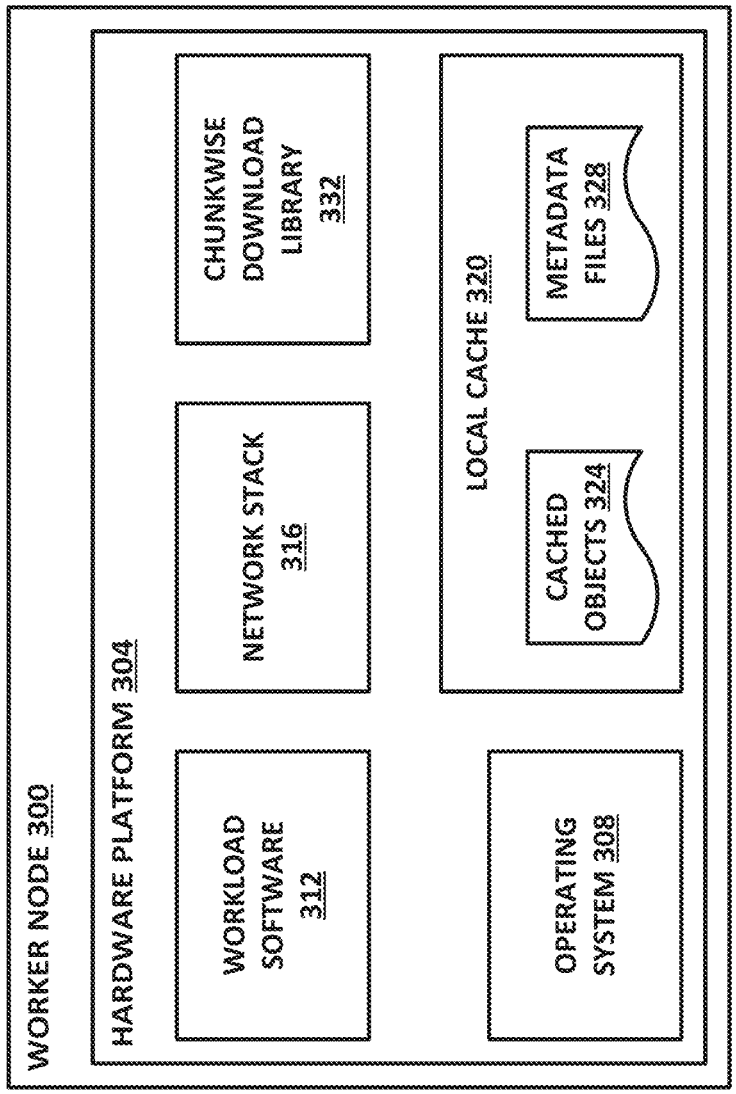
FIG. 3 is a block diagram of selected elements of a worker node.

FIG. 3 is a block diagram of selected elements of a worker node 300. Worker node 300 may be configured to provide various services such as software builds and simulations. Worker node 300 includes a hardware platform 304, which may be an embodiment of hardware platform 800 as illustrated in FIG. 8 or any other appropriate hardware platform.

Worker node 300 includes an operating system 308 which provides basic operating services. Worker node 300 also includes workload software 312, which provides the code necessary for carrying out the function of worker node 300. Worker node 300 includes a network stack 316, which may provide the hardware and software necessary to communicate with remote hosts, such as a server that hosts a large data object repository. Network stack 316 may provide a known network stack, such as the seven-layer open systems interconnect (OSI) or another similar stack.

Hardware platform 304 may include a local cache 320 which may cache one or more objects that worker node 300 operates on. Local cache 320 may include cached objects 324 and metadata files 328. Metadata files 328 may include chunking information about cached objects 324, which can assist in accelerating downloads of updates to cached objects 324.

Worker node 300 may include a download accelerator library 332. Download accelerator library 332 may include logic or instructions to carry out the download acceleration functions illustrated herein. For example, download accelerator library 332 may include an implementation of a CDC, such as FastCDC or another CDC. Download accelerator library 332 may also include logic to request a manifest for an artifact to be downloaded and to query metadata files 328 for chunks that already exist within cached objects 324.

Metadata files 328 may optionally be stored in a CAS such that download accelerator library 332 may receive hashes of chunks from the file to be downloaded and may query the CAS for those hashes to identify matching chunks within cached objects 324.

Figure 4A:
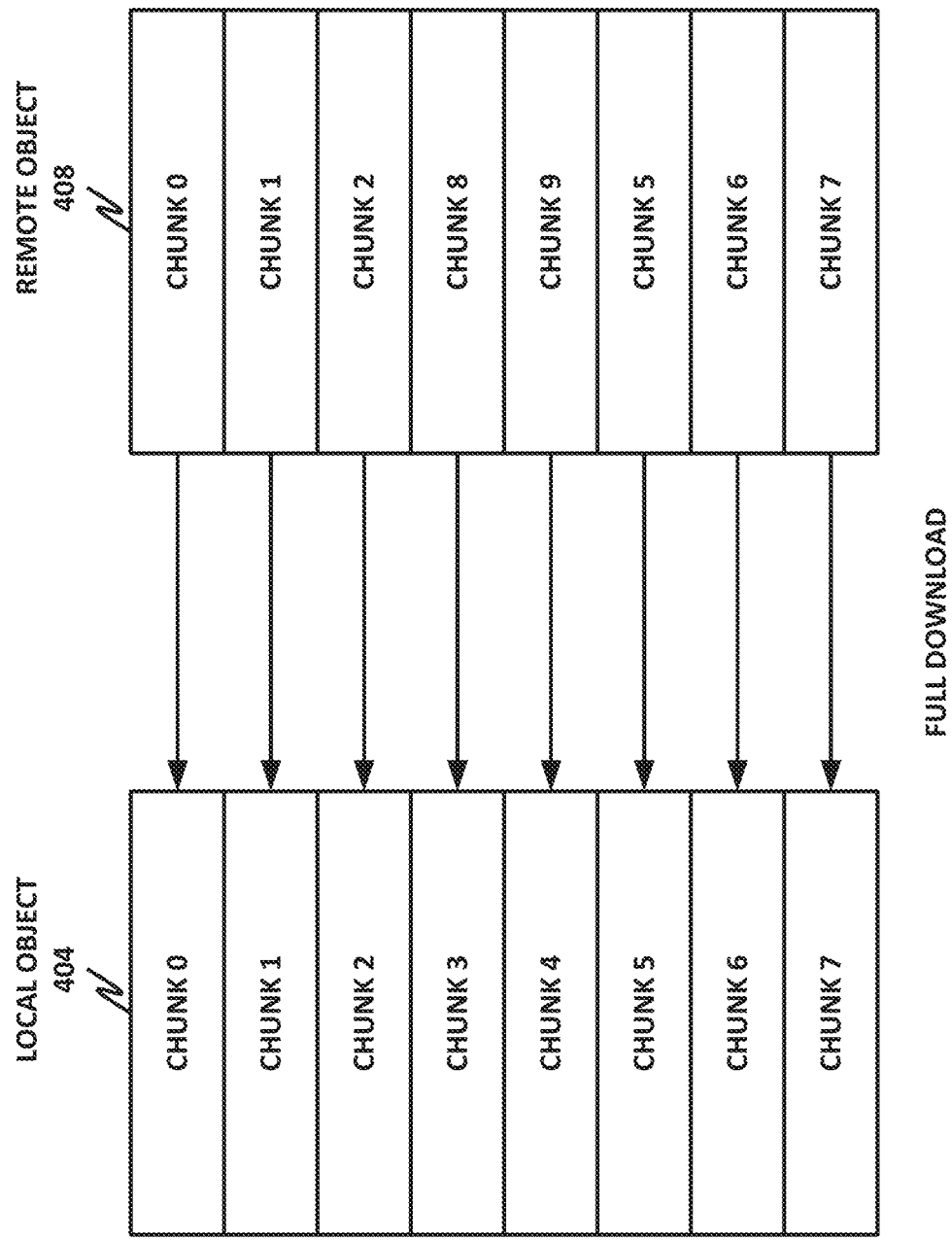
FIGS. 4A and 4B are block diagram illustrations of downloads illustrating advantages that may be realized by download acceleration
Figure 4B:
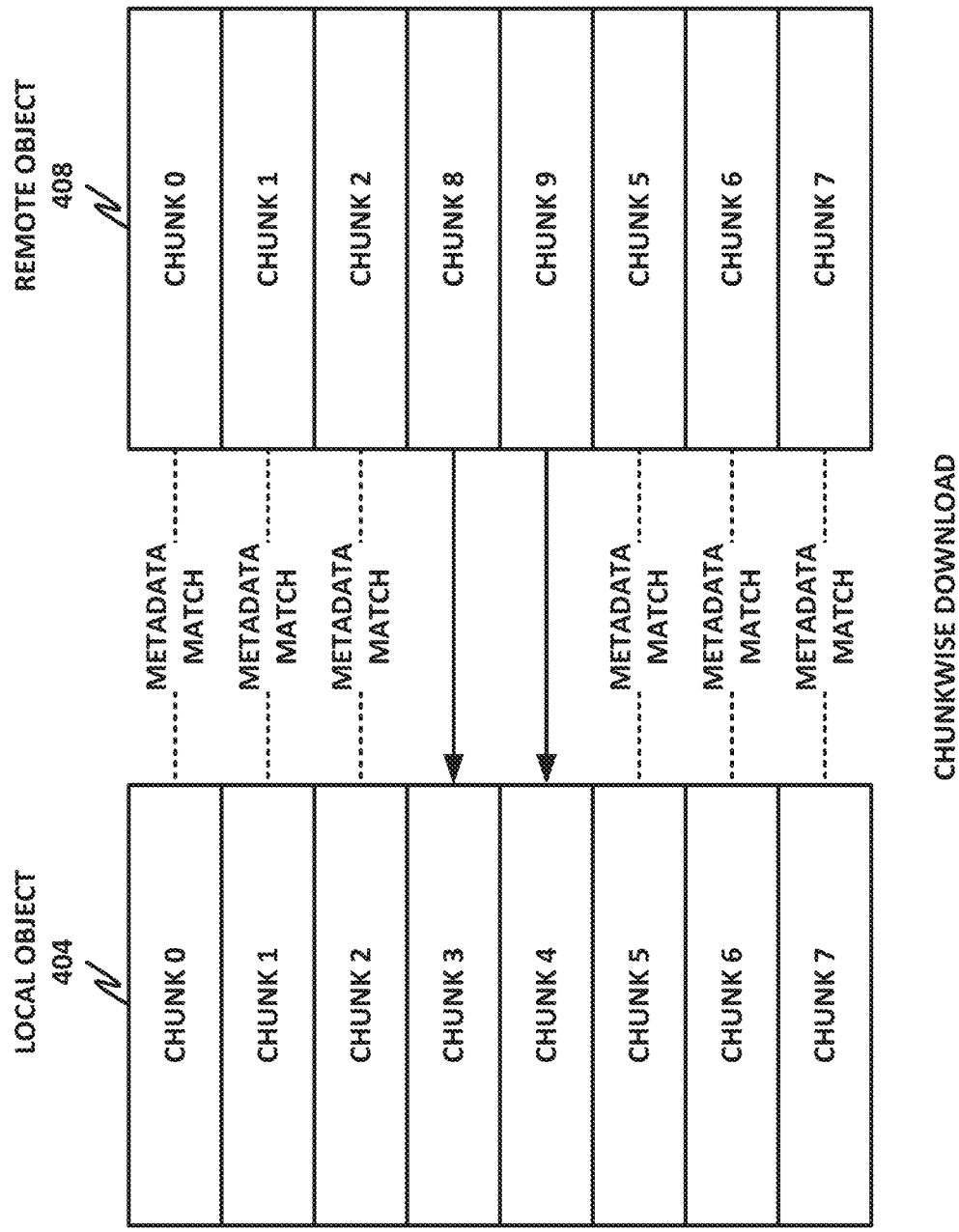

FIGS. 4A and 4B are a block diagram illustration of downloads illustrating advantages that may be realized by download acceleration.

In FIG. 4A, local object 404 includes several chunks, namely chunk 0, chunk 1, chunk 2, chunk 3, chunk 4, chunk 5, chunk 6, and chunk 7. Remote object 408 includes chunk 0, chunk 1, chunk 2, chunk 8, chunk 9, chunk 5, chunk 6, and chunk 7.

In a full download regimen, remote object 408 is downloaded as a single monolithic object. Thus, remote object 408 replaces local object 404 en grosse. However, as seen here, a number of chunks in local object 404 are replicated in remote object 408. Thus, these chunks are downloaded unnecessarily because the data are already resident on the local system.

FIG. 4B illustrates a chunkwise download that realizes advantages. In this example, a download accelerator library may recognize that chunk 0, chunk 1, chunk 2, chunk 5, chunk 6, and chunk 7 are already resident in local object 404. Thus, there is no need to download these chunks from remote object 408. Instead, a download accelerator library may identify metadata matches between these chunks and determine that the chunks do not need to be downloaded. Instead, the download accelerator library downloads only chunks 8 and 9 and replaces chunks 3 and 4 with the downloaded items. This allows the download accelerator library to build a local copy of remote object 408 without downloading the full object. To validate that the download was performed correctly, the accelerator library may checksum the modified local object 404, and verify it against a known checksum of remote object 408.

Figure 5:
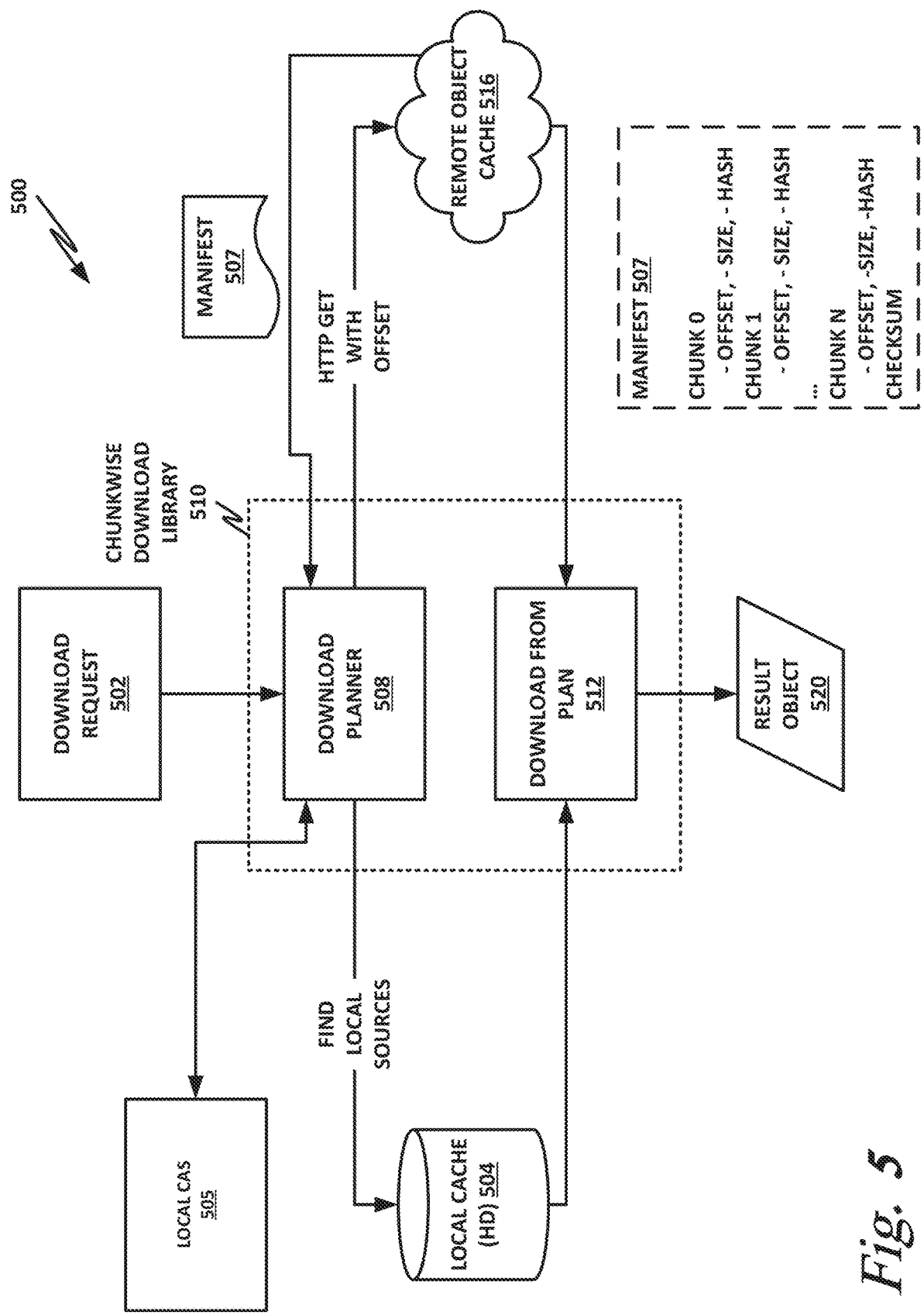
FIG. 5 is a block diagram illustration of selected elements of a download acceleration ecosystem.

FIG. 5 is a block diagram illustration of selected elements of a download acceleration ecosystem 500.

In this example, a local cache 504 may be stored on a local hard drive, solid-state disk, or other local storage. Local cache 504 may include one or more artifacts that the local system has previously used. When the system needs a new artifact, it may issue a download request 502, which may be to download a particular object or artifact from remote object cache 516.

A chunkwise download library 510 may provide download acceleration services. Download library 510 includes a download planner 508. Download planner 508 may download a manifest 507 with metadata about the remote object, such as the offset, size, and hash of each chunk, and a checksum for the binary object. Download planner 508 may search a local CAS 505 for metadata frames that match hashes of chunks in manifest 507. Chunks found in CAS 505 correspond to chunks available in local cache 504. Download planner 508 may then build a download plan 512, which includes identifying chunks not available in local cache that need to be downloaded from remote object cache 516.

Download library 510 may next download data according to download plan 512. Specifically, download library 510 may retrieve necessary chunks from both remote object cache 516 and from local cache 504. These chunks may then be sorted as necessary, and compiled into a copy of the remote object, which may be stored as result object 520. Result object 520 should be a binary copy of the remote object. To verify that the download was successful, download library 510 may hash result object 520 and compare it to a hash of the remote object in manifest 507. If the hashes match, then the system may determine with high confidence that the remote object was downloaded successfully.

Figure 6:
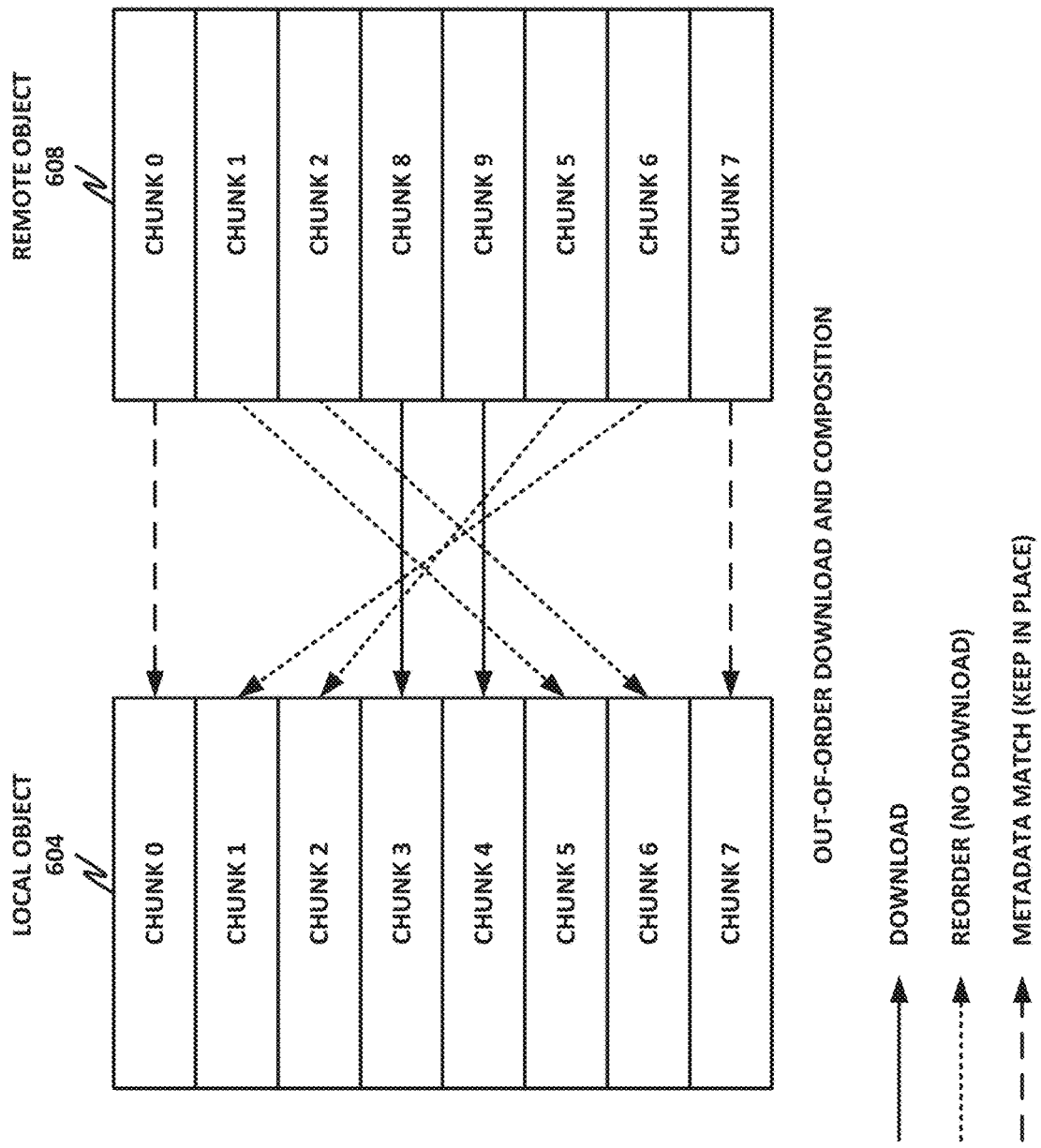
FIG. 6 is a block diagram illustrating that a download library of the present specification may deal with out-of-order data.

FIG. 6 is a block diagram illustrating that a download library of the present specification may deal with out-of-order data. In this example, local object 604 includes chunk 0, chunk 1, chunk 2, chunk 3, chunk 4, chunk 5, chunk 6, and chunk 7. Remote object 608 includes chunk 0, chunk 5, chunk 6, chunk 8, chunk 9, chunk 2, chunk 1, and chunk 7. In this case, the only chunks of remote object 608 that are not already available in local object 604 are chunks 8 and 9. However, chunks 1, 2, 5, and 6 are out-of-order in local object 604. Thus, the download library keeps chunk 0 and chunk 7 in their existing position. Chunks 5, 6, 2, and 1 are not redownloaded but may be reordered to place them in their proper position to mirror remote object 608. Chunk 8 and chunk 9 are not available on local object 604 and thus may need to be downloaded from remote object 608 and ordered into their correct position. The result is that a new local object can be built that mirrors remote object 608 notwithstanding some of the chunks are missing and/or out-of-order.

Figure 7:
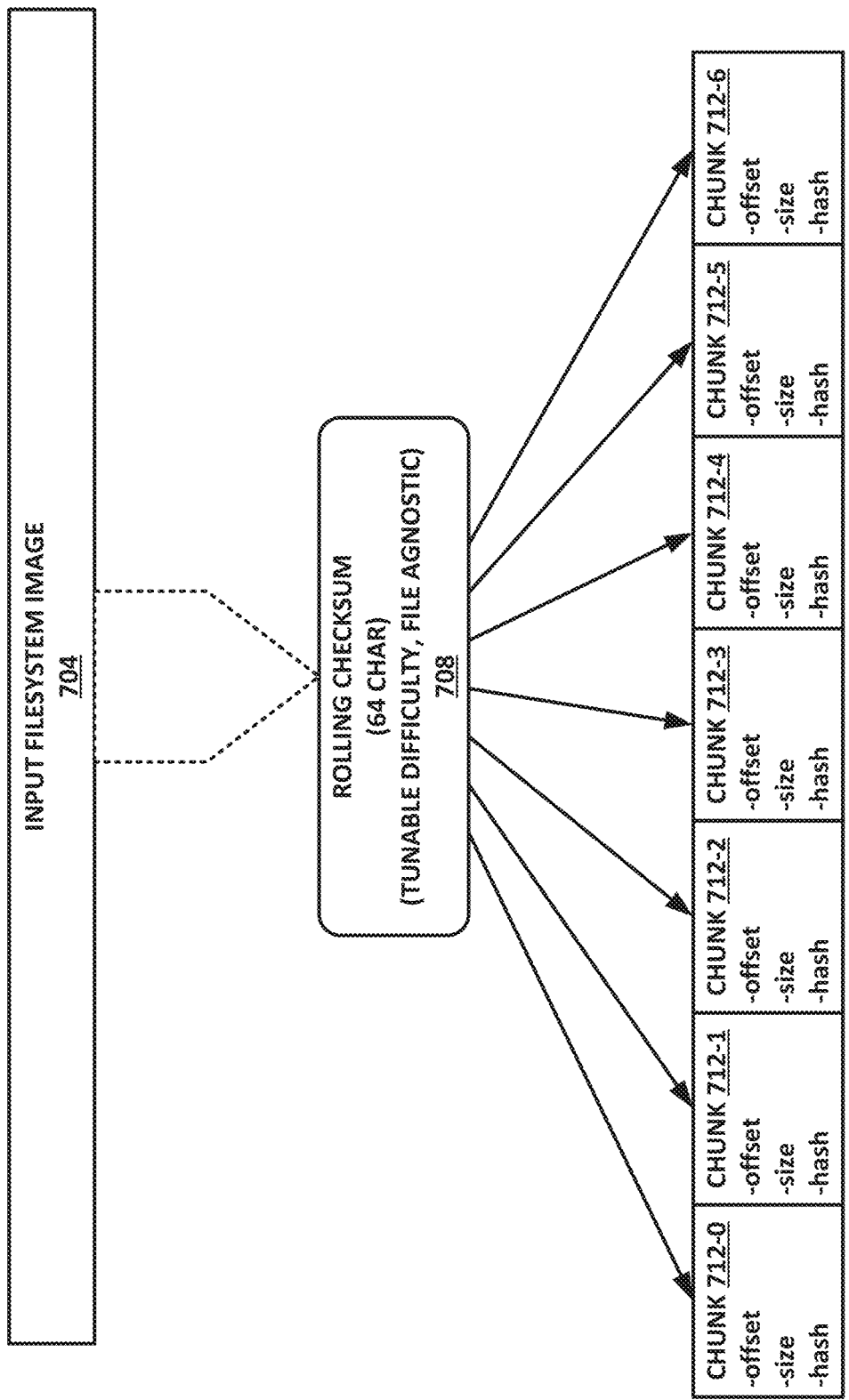
FIG. 7 is a block diagram illustrating selected aspects of content-defined chunking.

FIG. 7 is a block diagram illustrating selected aspects of content-defined chunking. In this example, an input file system image 704 is to be processed according to a CDC algorithm. Input file system image 704 may be, for example, a SquashFS image or similar.

In block 708, the system may calculate a rolling checksum on input file system image 704. This rolling checksum may be, by way of illustrative example, a 64-character rolling checksum. This checksum algorithm may have a tunable difficulty and may be file agnostic. In other words, the checksum algorithm need not be concerned with file boundaries within the file system image. Rather, the entire filesystem may be treated as a single monolithic binary object and may be divided into chunks based on the CDC algorithm. It is expected that some files within the filesystem image will be divided into multiple chunks. It is also expected that sometimes, a chunk may include multiple files, or may include portions of multiple files that are misaligned with filesystem boundaries. Because large portions of a filesystem image may remain unchanged between various versions, file alignment may be of lesser importance to some embodiments.

In some embodiments, the algorithm may be tuned to account for factors such as network bandwidth, storage medium (including the speed and capacity of the storage medium), or scalability of the storage medium. For example, some storage media may have a minimum content size, which may influence the tuning of the CDC algorithm. In some examples, storage nodes may also scale according to the size of the largest object. For example, if the largest object in a data set is 100 GB, then the smallest new node size for that system may be 100 GB. By using the chunking methods described here, the storage nodes may scale more efficiently.

The CDC computation of block 708 may yield a plurality of chunks, such as chunk 712-0, chunk 712-1, chunk 712-2, chunk 712-3, chunk 712-4, chunk 712-5, and chunk 712-6. Each of these chunks may be identified by an offset and a size. The chunk data structure may also store a hash for the chunk. The hash may be a cryptographic hash, such as SHA256 or similar. The specific hash function may be chosen to optimize for performance, or the likelihood of collision. For example, a hash function with lower likelihood of collision may be used, but the higher the resolution of the hash function, the more resources required to compute it.

Chunk data structures 712 may then be stored in a CAS so that chunks can be accessed by their hash rather than by their position. The use of a CAS provides advantages in that it may be more efficient to reorder chunks in cases where the new image has data that are out-of-order but that are otherwise identical to the old image. In some cases, chunk data structures 712 may be stored in a protocol buffer. Protocol buffers are a relatively recent specification for a language-independent interface definition, which can be used to serialize data. Other formats could also be used, such as JavaScript Object Notation (JSON) or similar.

FIG. 8 is a block diagram of a hardware platform 800. Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Hardware platform 800 may provide a suitable structure for controller 104 of FIG. 1, as well as for other computing elements illustrated throughout this specification, including worker node 300. Depending on the embodiment, elements of hardware platform 800 may be omitted, and other elements may be included.

Hardware platform 800 is configured to provide a computing device. In various embodiments, a "computing device" may be or comprise, by way of nonlimiting example, a computer, system on a chip (SoC), workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 800 is arranged in a point-to-point (PtP) configuration. This PtP configuration is popular for personal computer (PC) and server-type devices, although it is not so limited, and any other bus type may be used. The PtP configuration may be an internal device bus that is separate from CAN bus 170 of FIG. 1, although in some embodiments they may interconnect with one another.

Hardware platform 800 is an example of a platform that may be used to implement embodiments of the teachings of this specification. For example, instructions could be stored in storage 850. Instructions could also be transmitted to the hardware platform in an ethereal form, such as via a network interface, or retrieved from another source via any suitable interconnect. Once received (from any source), the instructions may be loaded into memory 804, and may then be executed by one or more processor 802 to provide elements such as an operating system 806, operational agents 808, or data 812.

Hardware platform 800 may include several processors 802. For simplicity and clarity, only processors PROCO 802-1 and PROC1 802-2 are shown. Additional processors (such as 2, 4, 8, 16, 24, 32, 64, or 128 processors) may be provided as necessary, while in other embodiments, only one processor may be provided. Processors may have any number of cores, such as 1, 2, 4, 8, 16, 24, 32, 64, or 128 cores.

Processors 802 may be any type of processor and may communicatively couple to chipset 816 via, for example, PtP interfaces. Chipset 816 may also exchange data with other elements. In alternative embodiments, any or all of the PtP links illustrated in FIG. 8 could be implemented as any type of bus, or other configuration rather than a PtP link. In various embodiments, chipset 816 may reside on the same die or package as a processor 802 or on one or more different dies or packages. Each chipset may support any suitable number of processors 802. A chipset 816 (which may be a chipset, uncore, Northbridge, Southbridge, or other suitable logic and circuitry) may also include one or more controllers to couple other components to one or more central processor units (CPU).

Two memories, 804-1 and 804-2 are shown, connected to PROC0 802-1 and PROC1 802-2, respectively. As an example, each processor is shown connected to its memory in a direct memory access (DMA) configuration, though other memory architectures are possible, including ones in which memory 804 communicates with a processor 802 via a bus. For example, some memories may be connected via a system bus, or in a data center, memory may be accessible in a remote DMA (RDMA) configuration.

Memory 804 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 804 may be used for short, medium, and/or long-term storage. Memory 804 may store any suitable data or information utilized by platform logic. In some embodiments, memory 804 may also comprise storage for instructions that may be executed by the cores of processors 802 or other processing elements (e.g., logic resident on chipsets 816) to provide functionality.

In certain embodiments, memory 804 may comprise a relatively low-latency volatile main memory, while storage 850 may comprise a relatively higher-latency nonvolatile memory. However, memory 804 and storage 850 need not be physically separate devices, and in some examples may simply represent a logical separation of function (if there is any separation at all). It should also be noted that although DMA is disclosed by way of nonlimiting example, DMA is not the only protocol consistent with this specification, and that other memory architectures are available.

Certain computing devices provide main memory 804 and storage 850, for example, in a single physical memory device, and in other cases, memory 804 and/or storage 850 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Chipset 816 may be in communication with a bus 828 via an interface circuit. Bus 828 may have one or more devices that communicate over it, such as a bus bridge 832, I/O devices 835, accelerators 846, and communication devices 840, by way of nonlimiting example. In general terms, the elements of hardware platform 800 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 840 can broadly include any communication not covered by a network interface and the various I/O devices described herein. This may include, for example, various universal serial bus (USB), FireWire, Lightning, or other serial or parallel devices that provide communications. In a particular example, communication device 840 may be used to stream and/or receive data within a CAN. For some use cases, data may be streamed using UDP, which is unidirectional and lacks error correction. UDP may be appropriate for cases where latency and overhead are at a higher premium than error correction. If bi-directional and/or error corrected communication are desired, then a different protocol, such as TCP may be preferred.

I/O devices 835 may be configured to interface with any auxiliary device that connects to hardware platform 800 but that is not necessarily a part of the core architecture of hardware platform 800. A peripheral may be operable to provide extended functionality to hardware platform 800 and may or may not be wholly dependent on hardware platform 800. In some cases, a peripheral may itself be a. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

Bus bridge 832 may be in communication with other devices such as a keyboard/mouse 838 (or other input devices such as a touch screen, trackball, etc.), communication devices 840 (such as modems, network interface devices, peripheral interfaces such as PCI or PCIe, or other types of communication devices that may communicate through a network), and/or accelerators 846. In alternative embodiments, any portions of the bus architectures could be implemented with one or more PtP links.

Operating system 806 may be, for example, Microsoft Windows, Linux, UNIX, Mac OS X, iOS, MS-DOS, or an embedded or real-time operating system (including embedded or real-time flavors of the foregoing). For real-time systems such as an AV, various forms of QNX are popular. In some embodiments, a hardware platform 800 may function as a host platform for one or more guest systems that invoke application (e.g., operational agents 808).

Operational agents 808 may include one or more computing engines that may include one or more non-transitory computer-readable mediums having stored thereon executable instructions operable to instruct a processor to provide operational functions. At an appropriate time, such as upon booting hardware platform 800 or upon a command from operating system 806 or a user or security administrator, a processor 802 may retrieve a copy of the operational agent (or software portions thereof) from storage 850 and load it into memory 804. Processor 802 may then iteratively execute the instructions of operational agents 808 to provide the desired methods or functions.

There are described throughout this specification various engines, modules, agents, servers, or functions. Each of these may include any combination of one or more logic elements of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

In some cases, the function of an engine is described in terms of a "circuit" or "circuitry to" perform a particular function. The terms "circuit" and "circuitry" should be understood to include both the physical circuit, and in the case of a programmable circuit, any instructions or data used to program or configure the circuit.

Where elements of an engine are embodied in software, computer program instructions may be implemented in programming languages, such as an object code, an assembly language, or a high-level language. These may be used with any compatible operating systems or operating environments. Hardware elements may be designed manually, or with a hardware description language. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

Communication devices 840 may communicatively couple hardware platform 800 to a wired or wireless network or fabric. A "network," as used throughout this specification, may include any communicative platform operable to exchange data or information within or between computing devices, including any of the protocols discussed in connection with FIG. 1 above. A network interface may include one or more physical ports that may couple to a cable (e.g., an Ethernet cable, other cable, or waveguide), or a wireless transceiver.

In some cases, some or all of the components of hardware platform 800 may be virtualized, in particular the processor(s) and memory. For example, a virtualized environment may run on OS 806, or OS 806 could be replaced with a hypervisor or virtual machine manager. In this configuration, a virtual machine running on hardware platform 800 may virtualize workloads. A virtual machine in this configuration may perform essentially all the functions of a physical hardware platform.

In a general sense, any suitably configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 8 may be combined in a SoC architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Selected Examples

There is disclosed in an example, a computing apparatus, comprising: one or more processor circuits, one or more memories; and instructions encoded on the memory to instruct the one or more processor circuits to: divide a first binary data object into a plurality of variable-sized chunks via a CDC algorithm; store chunkwise metadata for the plurality of variable-sized chunks, the chunkwise metadata comprising hashes for the plurality of variable-sized chunks; identify a remote binary data object for download to the computing apparatus; query a CAS using the chunkwise metadata to identify a first group of chunks of the first binary data object that are found in the CAS, and a second group of chunks of the binary data object that are not found in the CAS; and download to the computing apparatus only the second group of chunks, and build from the second group of chunks and the first group of chunks a copy of the remote binary data object.

There is further disclosed an example wherein the instructions are further to determine that at least some chunks of the first group of chunks are out-of-order, and to reorder the out-of-order chunks.

There is further disclosed an example wherein the instructions are further to create a download plan for downloading the second group of chunks.

There is further disclosed an example wherein the download plan comprises issuing hypertext transfer protocol (HTTP) GET requests for offsets that align with the second group of chunks.

There is further disclosed an example wherein the first binary data object is a binary filesystem image.

There is further disclosed an example wherein the CDC algorithm is filesystem agnostic.

There is further disclosed an example wherein the CDC algorithm is FastCDC.

There is further disclosed an example wherein the hashes for the plurality of variable-sized chunks are sha256 hashes.

There is further disclosed an example wherein the chunkwise metadata include chunk size and chunk offset.

There is further disclosed an example wherein the instructions are further to launch multiple threads to download the second group of chunks.

There is further disclosed an example wherein the instructions are further to checksum the copy of the remote binary data object, and validate the checksum of the copy of the remote binary data object.

There is further disclosed an example wherein the instructions are further to store the chunkwise metadata in a protocol buffer.

There is further disclosed an example of one or more tangible, non-transitory computer-readable media having stored thereon instructions, the instructions when executed to instruct one or more processors to: cache a first filesystem image; use CDC to divide the first filesystem image into a plurality of variable-sized chunks; compute individual hashes for the variable-sized chunks, and store the individual hashes in a memory; download a second filesystem image from a remote data source, wherein the second filesystem image is divided into a plurality of variable-sized chunks, wherein downloading the second filesystem image comprises receiving hashes for the variable-sized chunks of the second filesystem image, and querying the memory for matching individual hashes of the variable-sized chunks of the first filesystem image, and downloading chunks not found in the querying; and building a copy of the second filesystem image from a combination of the downloaded chunks and chunks found in the querying.

There is further disclosed an example, wherein the memory is a content addressable memory.

There is further disclosed an example, wherein building a copy of the second filesystem image from the combination of the downloaded chunks and chunks found in the querying comprises reordering chunks.

There is further disclosed an example, wherein the instructions are further to determine that at least some chunks found in the querying are out-of-order, and to reorder the out-of-order chunks.

There is further disclosed an example, wherein the instructions are further to create a download plan for downloading chunks not found in the querying.

There is further disclosed an example, wherein the download plan comprises issuing hypertext transfer protocol (HTTP) GET requests for offsets that align with the chunks not found in the querying There is further disclosed an example, wherein the CDC is filesystem agnostic.

There is further disclosed an example, wherein the CDC comprises a FastCDC algorithm.

There is further disclosed an example, wherein the individual hashes for the variable-sized chunks are sha256 hashes.

There is further disclosed an example, wherein the instructions are further to store chunk size and chunk offset for the variable-sized chunks.

There is further disclosed an example, wherein the instructions are further to launch multiple threads to download the chunks not found in the querying.

There is further disclosed an example, wherein the instructions are further to checksum the copy of the second filesystem image, and validate the checksum of the copy of the second filesystem image.

There is further disclosed an example, wherein the instructions are further to store the individual hashes, along with associated metadata, in a protocol buffer.

There is further disclosed an example of a computer-implemented method, comprising: dividing a first binary image into a plurality of variable-sized chunks, wherein the first binary image is an aggregate of a plurality of files, and wherein the dividing does not depend on file boundaries; computing hashes of the variable-sized chunks, and storing the hashes in a CAS with the hashes as keys; receiving a manifest comprising an ordered set of second hashes, wherein the second hashes are hashes of chunks of a second binary image to be downloaded; building a download plan, comprising searching the CAS for the second hashes, compiling a first group of hashes found in the CAS, and compiling a second group of hashes not found in the CAS, and ordering the first group of hashes and second set of hashes to comply with the manifest; downloading chunks corresponding to the second group of hashes; and reordering the downloaded chunks and chunks that correspond to first group of hashes to build a copy of the second binary image.

There is further disclosed an example wherein the manifest further comprises a hash of the second binary image, and further comprising hashing the copy of the second binary image, and comparing to the hash of the second binary image.

There is further disclosed an example wherein dividing the first binary image into the plurality of variable-sized chunks comprises using a CDC algorithm.

There is further disclosed an example wherein the CDC algorithm is filesystem agnostic.

There is further disclosed an example wherein the CDC algorithm is FastCDC.

There is further disclosed an example wherein the download plan comprises issuing hypertext transfer protocol (HTTP) GET requests for offsets that align with the chunks corresponding to the second group of hashes.

There is further disclosed an example wherein the first binary image is a binary filesystem image.

There is further disclosed an example wherein the hashes of the variable-sized chunks are sha256 hashes.

There is further disclosed an example further comprising storing chunk sizes and chunk offsets with the hashes of the variable-sized chunks.

There is further disclosed an example further comprising storing the hashes, chunk sizes, chunk offsets, and chunk hashes in a protocol buffer.

There is further disclosed an example further comprising launching multiple threads to download the chunks corresponding to the second group of hashes.

There is further disclosed an example further comprising computing a checksum of the copy of the second binary image, and validate the checksum.

There is further disclosed an example further comprising checksumming the copy of the second binary image, and validating the checksum of the second binary image.

There is further disclosed an example of an apparatus comprising means for performing the method.

There is further disclosed an example wherein the means for performing the method comprise a processor and a memory.

There is further disclosed an example wherein the memory comprises machine-readable instructions that, when executed, cause the apparatus to perform the method.

There is further disclosed an example wherein the apparatus is a computing system.

There is further disclosed an example of at least one computer-readable medium comprising instructions that, when executed, implement a method or realize an apparatus as claimed.

Variations and Implementations

As will be appreciated by one skilled in the art, aspects of the present disclosure, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module," or "system." In at least some cases, a "circuit" may include both the physical hardware of the circuit, plus any hardware or firmware that programs or configures the circuit. For example, a network circuit may include the physical network interface circuitry, as well as the logic (software and firmware) that provides the functions of a network stack.

Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The foregoing detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While components, arrangements, and/or features are described below in connection with various example embodiments, these are merely examples used to simplify the present disclosure and are not intended to be limiting.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," "top," "bottom," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The "means for" in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

What is claimed is:

1. A computing apparatus, comprising:
   one or more processor circuits;
   one or more memories; and
   instructions encoded on the memory to instruct the one or more processor circuits to:
   perform a first simulation task using a first binary data object;
   divide the first binary data object into a plurality of variable-sized chunks via a content-defined chunking (CDC) algorithm, the first binary data object having a data structure that includes vehicle sensor data for vehicle simulation;
   store chunkwise metadata for the plurality of variable-sized chunks, the chunkwise metadata comprising hashes for the plurality of variable-sized chunks;
   identify a remote binary data object for download to the computing apparatus, the remote binary data object used for a second simulation task;
   query a content addressable storage (CAS) using the chunkwise metadata to identify a first group of chunks of the first binary data object that are found in the CAS, and a second group of chunks of the first binary data object that are not found in the CAS;
   download to the computing apparatus only the second group of chunks, and build from the second group of chunks and the first group of chunks a copy of the remote binary data object; and
   perform the second simulation task using the copy of the remote binary object.

2. The computing apparatus of claim 1, wherein the instructions are further to determine that a first portion of chunks of the first group of chunks are out-of-order in the first binary data object and that a second portion of chunks of the first group of chunks are in-order in the first binary data object, and to keep the second portion of chunks in their existing position and to reorder the first portion of chunks.

3. The computing apparatus of claim 1, wherein the instructions are further to create a download plan for downloading the second group of chunks.

4. The computing apparatus of claim 3, wherein the download plan comprises issuing hypertext transfer protocol (HTTP) GET requests for offsets that align with the second group of chunks.

5. The computing apparatus of claim 1, wherein the first binary data object is a binary filesystem image.

6. The computing apparatus of claim 1, wherein the CDC algorithm is FastCDC.

7. The computing apparatus of claim 1, wherein the hashes for the plurality of variable-sized chunks are SHA256 hashes.

8. The computing apparatus of claim 1, wherein the chunkwise metadata include chunk size and chunk offset.

9. The computing apparatus of claim 1, wherein the instructions are further to launch multiple threads to download the second group of chunks.

10. The computing apparatus of claim 1, wherein the instructions are further to checksum the copy of the remote binary data object, and validate the checksum of the copy of the remote binary data object.

11. The computing apparatus of claim 1, wherein the instructions are further to store the chunkwise metadata in a protocol buffer.

12. One or more tangible, non-transitory computer-readable media having stored thereon instructions, the instructions when executed to instruct one or more processors to:
compute an output of a first simulation task using a first filesystem image, the first filesystem image having a data structure that includes autonomous vehicle sensor data for autonomous vehicle simulation;
cache the first filesystem image;
use content-defined chunking (CDC) to divide the first filesystem image into a plurality of variable-sized chunks;
compute individual hashes for the variable-sized chunks, and store the individual hashes in a memory;
download a second filesystem image from a remote data source, wherein the second filesystem image is used for a second simulation task and divided into a plurality of variable-sized chunks, wherein downloading the second filesystem image comprises receiving hashes for the variable-sized chunks of the second filesystem image, and querying the memory for matching individual hashes of the variable-sized chunks of the first filesystem image, and downloading chunks corresponding to the matching individual hashes;
build a copy of the second filesystem image from a combination of the downloaded chunks and the matching chunks found in the querying; and
compute an output of the second simulation task using the copy of the second filesystem image.

13. The one or more tangible, non-transitory computer-readable media of claim 12, wherein the memory is a content addressable memory.

14. The one or more tangible, non-transitory computer-readable media of claim 12, wherein building a copy of the second filesystem image from the combination of the downloaded chunks and chunks found in the querying comprises reordering chunks.

15. The one or more tangible, non-transitory computer-readable media of claim 12, wherein the instructions are further to determine that a first portion of the variable-sized chunks of the first filesystem image found in the querying are out-of-order chunks and that a second portion of variable-sized chunks of the first filesystem image found in the querying are in-order chunks, and to keep the second portion of variable-sized chunks in their existing position and to reorder the the first portion of variable-sized chunks.

16. The one or more tangible, non-transitory computer-readable media of claim 12, wherein the instructions are further to store chunk size and chunk offset for the variable-sized chunks.

17. A computer-implemented method, comprising:
performing, at a worker node, a first simulation task using a first binary image, the first binary image having a data structure that includes autonomous vehicle sensor data for autonomous vehicle simulation;
dividing the first binary image into a plurality of variable-sized chunks, wherein the first binary image is an aggregate of a plurality of files, and wherein the dividing does not depend on file boundaries;
computing hashes of the variable-sized chunks, and storing the hashes in a content addressable storage (CAS) with the hashes as keys;
receiving a manifest comprising an ordered set of second hashes, wherein the second hashes are hashes of chunks of a second binary image to be downloaded and used in a second simulation task;
building a download plan, comprising searching the CAS for the second hashes, compiling a first group of hashes found in the CAS, and compiling a second group of hashes not found in the CAS, and ordering the first group of hashes and second set of hashes to comply with the manifest;
downloading chunks corresponding to the second group of hashes;
reordering the downloaded chunks and chunks that correspond to first group of hashes to build a copy of the second binary image; and
performing, at the worker node, the second simulation task using the copy of the second binary image.

18. The method of claim 17, wherein dividing the first binary image into the plurality of variable-sized chunks comprises using a content-defined chunking (CDC) algorithm.

19. The method of claim 18, wherein the CDC algorithm is filesystem agnostic.

* * * * *